United States Patent [19]
Gerresheim et al.

[11] Patent Number: 5,909,752
[45] Date of Patent: Jun. 8, 1999

[54] CONTAINER FOR THE SEALING OF TIRES WITH PUNCTURES

[75] Inventors: Manfred Gerresheim, Obertshausen-Hausen; Hans-Bernd Fuchs, Alzenau-Horstein; Ulrich Steinbrecht, Ober-Ramstadt, all of Germany

[73] Assignee: SP Reifenwerke GmbH, Hanau, Germany

[21] Appl. No.: 08/923,994

[22] Filed: Sep. 5, 1997

[30] Foreign Application Priority Data

Sep. 26, 1996 [DE] Germany .......................... 196 39 707

[51] Int. Cl.⁶ .................................................... B65B 31/00
[52] U.S. Cl. ........................... 141/38; 141/105; 141/329; 222/80; 222/81; 222/82; 222/94
[58] Field of Search .................................. 222/80, 81, 82, 222/94; 141/38, 105, 329; 152/502, 503, 504, 508, 509

[56] References Cited

U.S. PATENT DOCUMENTS 3,596,801  8/1971  Barnack ..................................... 222/81
3,635,261  1/1972  Morane et al. .......................... 141/329
4,842,164  6/1989  Davis et al. ............................... 222/94
5,072,762  12/1991  Jimenez ................................... 141/329
5,174,475  12/1992  Day et al. ................................. 222/94

*Primary Examiner*—David J. Walczak
*Assistant Examiner*—Timothy L. Maust
*Attorney, Agent, or Firm*—Birch, Stewart, Kolasch & Birch, LLP

[57] ABSTRACT

The invention relates to a container for the sealing of tires with punctures, with which it is possible to first mix a liquid sealant and a filler when sealing is to take place, but to keep them separate during the prior storage. The container has a first chamber for filler and a second chamber for the liquid sealant. The chambers are fixedly or movably connected together and at least one of the chambers can be compressed. Between the chambers there is a partition wall, which consists at least in part of a rupturable member which is torn so that the liquid sealant and the filler mix before injection of the mixture into the tire via an outlet valve by compression of the chamber.

11 Claims, 2 Drawing Sheets

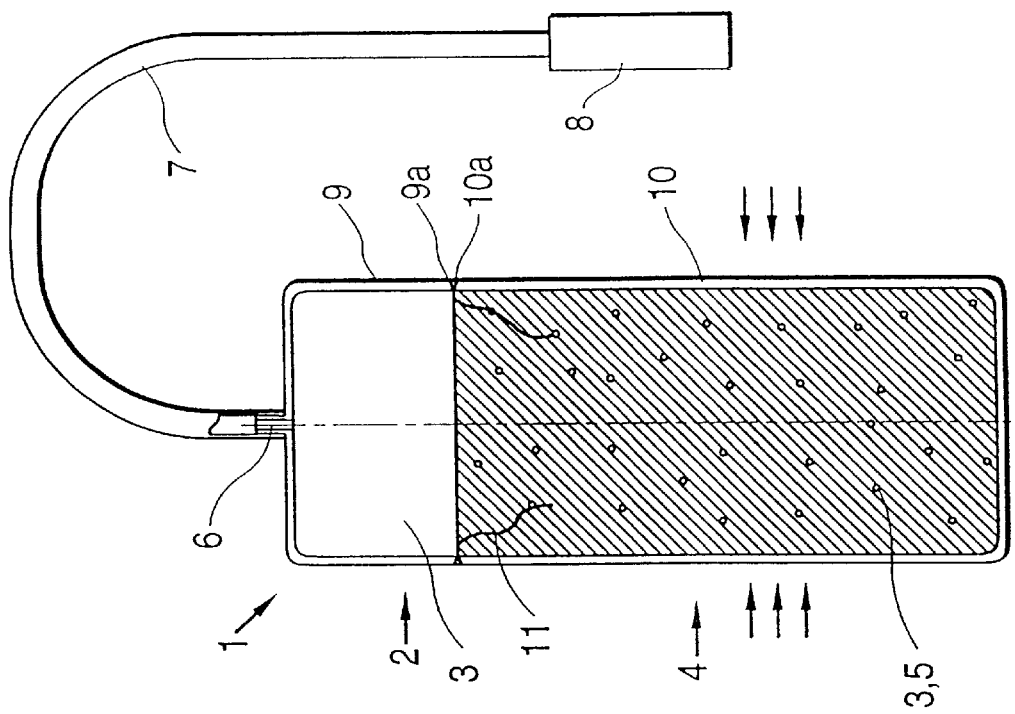
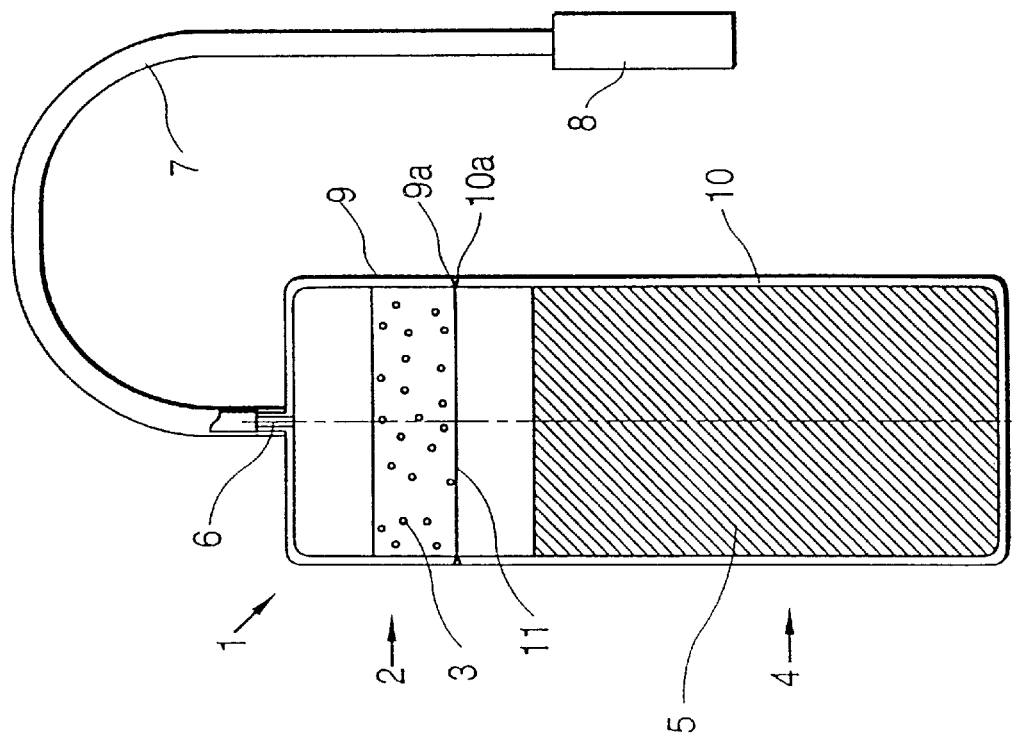

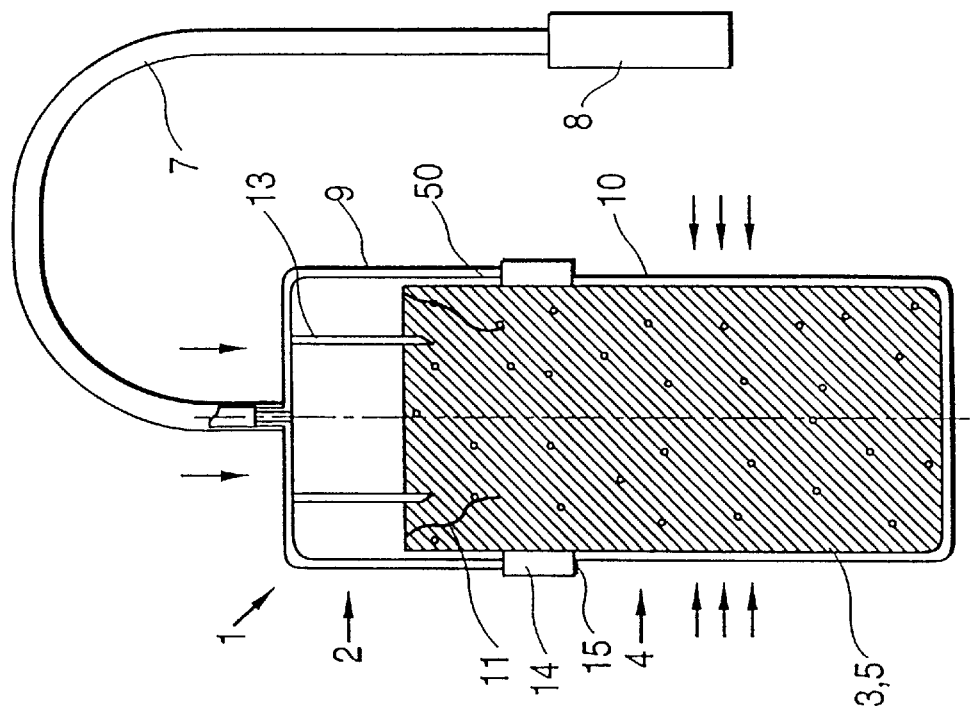
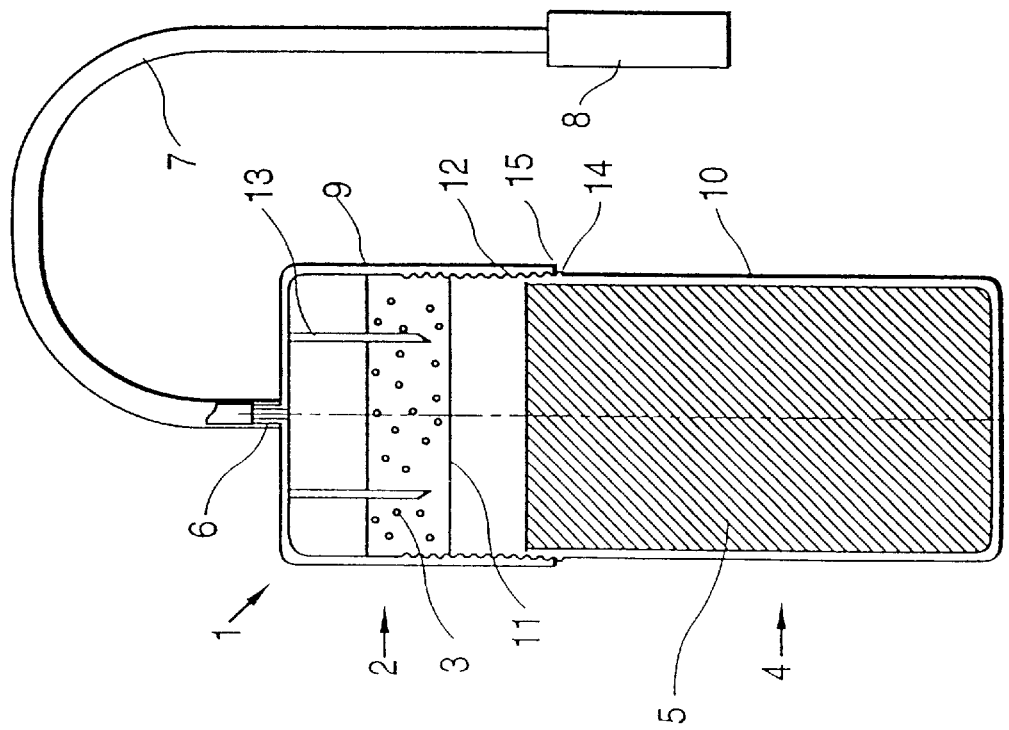

CONTAINER FOR THE SEALING OF TIRES WITH PUNCTURES

The invention relates to a container for the sealing of tires with punctures. The container serves to store the sealant and for the application of the sealant into the tire.

Sealants are increasingly used for repair of tire punctures. They mainly contain colloidal dispersions of polymers in an aqueous medium. Thus, for example, polystyrene butadiene latexes, polyvinylacetate latexes, acrylic copolymer latexes, nitrile latexes and rubber latexes are used. Such a sealant is described in the German patent application 195 45 935.0, which contains natural rubber latex and an adhesive resin. Furthermore, one or more fillers can be added to this sealant, which is of advantage for the sealing of larger holes. By way of example, silica, chalks, carbon black, styropor particles, rubber flour, which is obtained by the comminution of vulcanized materials such as tires, sawdust, moss rubber particles, particles of support foam for cut flowers, fibrous materials such as natural fibres, chemical fibres and the like come into question. These filler particles are added directly to the sealant and the filler particles have a shape and size which permits problem-free introduction via the tire valve.

In the event of a puncture the sealant is sprayed into the tire via the tire valve, and the tire is pumped up to a specific pressure by means of a propellant gas or compressor.

Various devices can be used for the introduction of the sealant into the tire and for the pumping up of the tire. Thus, by way of example, a pressure-tight container can be used which contains the sealant and a liquefied gas as the pressure source. A compressible plastic bottle can also be used, having an outlet valve which is connected via a plastic hose to the tire valve. The sealant is sprayed into the tire by compressing the plastic bottle. Thereafter, the tire can be pumped up again to a specific pressure, for example by means of a compressor or with the aid of carbon dioxide cartridges.

Prior to use of the sealant, it will generally be carried for a long time in the vehicle and during this time will be exposed to elevated temperatures. If the sealant already contains its filler, then agglomeration of the filler particles and of the liquid sealant can arise during the storage and transport, which makes trouble-free and problem-less introduction of the sealant into the tire via the tire valve difficult or impossible.

The object of the present invention was accordingly to provide a container for use in sealing tires in the event of punctures, in which these problems do not occur.

Accordingly the present invention provides a container having a first chamber to receive a solid filler, a second chamber to receive a liquid sealant, with the chambers being firmly or movably connected together, and with at least one of the two chambers being compressible, at least one partition wall between the chambers consisting at least in part of a rupturable member which can rupture to allow mixing of the chamber contents, and an outlet valve at one of the two chambers.

With this container, the liquid sealant and the solid filler are kept separate prior to use during the sealing of the tire, and are only mixed together directly before introduction into the tire. In this way the formation of an agglomerate during storage prior to use is avoided, so that the sealant can be sprayed without problem into the tire via the tire valve.

The initially named colloidal dispersion of polymers in aqueous medium can be used as the liquid sealant. The sealants described in the German patent application 195 45 935.0 and consisting of natural rubber latex or mixtures of rubber latex with a compatible adhesive resin are preferably used. The initially named fillers can be used as the solid filler materials, provided they are present in the form of particles, which enable introduction via the tire valve without blocking the latter. The filler particles preferably have a spherical shape.

The chambers can be fixedly connected together. For example, chambers consisting of plastic can be united to provide a single container in which the upper wall rim of the one chamber is welded to the lower wall rim of the other chamber. The chambers could, however, also be movably connected together, for example by a screw connection, a bayonet connection or a plug connection.

At least one of the chambers may be compressed or reduced in volume by outside force so that the sealing mixture can be sprayed via the outlet valve into the tire, after the rupturable member between the chambers has been broken. The outlet valve of the two chambers is connected to a hose, the other end of which is pushed onto the tire valve for the sealing of the tire. The end of the hose can, however, also be provided with an adapter which can be screwed onto the tire valve.

The chamber walls may consist of a plastic, preferably of polyethylene or polypropylene. Between the chambers there may be a partition wall which consists at least in part of a foil. The entire partition wall preferably consists of a foil or the rupturable member. The foil can, for example, consist of PVC, polycarbonate, Teflon, PE, PP, EPDM, silicones or aluminium. Furthermore, multiple layer foils can be used, the layers of which consist of combinations of the above-named materials.

In order to fill the chambers and connect the chambers into a container with the liquid sealant and the filler, an upwardly open, preferably cylinder-like chamber is filled with the liquid sealant. A second chamber with an open base is filled with the solid filler, and the base is closed off with a foil. This chamber with the closed base is then placed onto the chamber with the liquid sealant. The chamber walls may be welded together at their edges or connected together by a screw connection, a bayonet (50) connection or a plug connection (50). In these latter cases the chamber walls are correspondingly shaped in their marginal regions which are connected to one another. It is also possible to close off both chambers at their open ends with a foil, prior to the chambers being connected together to form the container, or to close only the chamber with the liquid sealant with the rupturable member. In the latter case this chamber with the part closed off by the rupturable member is placed onto the chamber containing the filler for the connection of the chambers.

The rupturable member is capable of tearing under the action of pressure. This pressure action is exerted when the sealing preparation is to be sprayed into a tire in the event of a puncture. On tearing of the member, the liquid sealant and the filler mix for subsequent introduction as a mixture into the tire by compression of the chamber walls.

In one embodiment the member is torn by the compression of the chamber walls. In this case a very thin plastic foil or a foil with a point of intended fracture is used as the rupturable member which is also the partition wall between the chambers. In this embodiment the chambers can be firmly welded together or can be movably connected together by one of the named connections.

In another embodiment the rupturable member is punctured by one or more spikes which are arranged in one of the chambers. In this case the chambers are movably connected together. The chambers are so connected together during the storage of the container that the spike or spikes do not contact the member. When the sealing of the tire is to take place, the chambers are moved towards one another by the movable connection so that the rupturable member is cut through and mixing of the liquid sealant and the solid filler occurs.

In order, on the one hand, to have a sealed connection of the chambers during storage and, on the other hand, to be able to move the chambers further towards one another when the container is to be used for the sealing of the tire, a safety screw connection can, for example, be provided such as is frequently used for containers with cleaning preparations. With such threaded connections, projections are arranged beneath the thread, which can only be overcome by a deliberate effort giving a special pressure. For example, the chambers can be further screwed onto one another so that the spike or the spikes cut through the rupturable member when sealing is to take place. The spikes are in the chamber which does not contain the separating rupturable member.

It is also possible to mount a ring which can be torn by a perforation outwardly on one of the two chambers at the chamber rim which comes into engagement with the other chamber. The chambers are screwed together or pushed together after filling and the application of the rupturable member to such an extent that the ring at the one chamber abuts against an abutment at the wall of the other chamber. For the cutting through of the member and a mixing of the liquid sealant and the solid filler, the ring is separated off so that the chambers can be moved towards one another into a second position in which the spikes tear the member.

In the embodiments with spikes, aluminium foils can also be used as the partition wall.

The invention will be explained, by way of example only, in more detail with reference to the drawings:

FIGS. 1a and 1b show schematic sections through an embodiment of the invention;

FIGS. 2a and 2b show schematic sections through a further embodiment of the invention. FIG. 2b shows that the connection (50) between the two chambers can be through screw connection, bayonet, or plug connection.

The container 1 consists of a first chamber 2 for receiving the filler 3, for example rubber particles, and a second chamber 4 for receiving the liquid sealing preparation 5, for example rubber latex. An outlet 6, to which a hose 7 is attached, is provided at the top of the chamber 2. An adapter 8 is provided at the other end of the hose 7 which can be screwed onto a tire valve. The walls 9 and 10 of the chambers 2 and 4 are welded together at their edges 9a and 10a. The chamber walls 9 and 10 consist, for example, of polyethylene and can be pressed together. At the upper edge of the chamber 4 there is a thin partition member 11 of, for example, polyethylene, PE. FIG. 1a shows the container in the form in which it is stored after manufacture until it is used in the event of a tire puncture. In the event of a tire puncture the adapter 8 is screwed onto the tire valve of the tire. Then the chamber wall 10 is compressed by hand, which is illustrated in FIG. 1b by arrows. The foil 11 thereby tears so that the liquid sealant 5 and the filler 3 can mix. The sealing mixture is sprayed into the tire by a repeated compression or squeezing of the container 1.

In FIGS. 2a and 2b the same parts are designated with the same reference numerals as in FIGS. 1a and b. In this embodiment the chambers 2 and 4 are connected together by a screw connection, bayonet, or plug connection 50 to form the container 1. In the upper chamber 2 there are spikes 13 which, in the screwed-together state, terminate just above the foil 11. FIG. 2a shows the container during storage.

When the container is to be used for the sealing of a tire puncture, the screw connection 12 is brought from the first position shown in FIG. 2a into the second position shown in FIG. 2b by pressure exerted from above (illustrated by arrows) by securing the chambers 2 and 4 further. The projections 14 and 15 then tear the foil 11, whereby a thorough-mixing of the liquid sealant 5 and filler 3 takes place. Thus, by compression of the container wall (illustrated by lateral arrows), the mixture is sprayed via the hose 7 into the tire.

Alternative assemblies are of course possible as are alternative materials for the rupturable member.

We claim:

1. A device for sealing a tire that has been punctured, which comprises:

a first chamber for containing a first material;

a second chamber for containing a second material the walls of at least the first or second chamber being compressible, and said first and second chambers being arranged co-axially end to end, and separated by a rupturable member;

means for rupturing said rupturable member; and outlet means connected to either of said first or second chamber whereby upon the rupturing of said member the whole contents of said chambers are mixed together and subsequently discharged through said outlet means.

2. A container in accordance with claim 1, wherein the rupturable member is provided with a weakened part at which fracture is intended to take place.

3. A container in accordance with claim 1, wherein the rupturable member can be torn by compressing at least one of the chambers.

4. A container in accordance with claim 1, wherein the chambers are movably connected together and at least one spike is so arranged in at least one of the chambers that the spike cuts through the rupturable member on movement of the chambers towards one another.

5. A container in accordance with claim 1, wherein the chambers are connected together by a threaded connection.

6. A container in accordance with claim 1, wherein the chambers are connected together by a bayonet closure.

7. A container in accordance with claim 1, wherein the chambers are connected together by a plug connection.

8. A container in accordance with claim 1, wherein the chambers are fixedly connected together by a welded joint.

9. A container in accordance with claim 1, wherein the chamber walls consist of polyethylene or polypropylene.

10. The device of claim 1, wherein the first and second material are combined to form a sealant.

11. The device of claim 1, wherein the first and second chambers are in screw engagement with each other and either said first or second chamber contains rupturing means whereby as the chambers are brought into complete engagement the rupturing means ruptures the rupturable member.

* * * * *